United States Patent [19]
Eitrheim

[11] Patent Number: 5,777,500
[45] Date of Patent: Jul. 7, 1998

[54] MULTIPLE CLOCK SOURCE GENERATION WITH INDEPENDENTLY ADJUSTABLE DUTY CYCLES

[75] Inventor: John K. Eitrheim, Plano, Tex.

[73] Assignee: Cyrix Corporation, Richardson, Tex.

[21] Appl. No.: 587,095

[22] Filed: Jan. 16, 1996

[51] Int. Cl.$^6$ .................................................. H03K 3/017
[52] U.S. Cl. .......................... 327/174; 327/161; 327/175; 327/237; 327/295
[58] Field of Search .................. 327/174–5, 161, 327/237, 295, 415

[56] References Cited

U.S. PATENT DOCUMENTS

| | | | |
|---|---|---|---|
| 5,414,381 | 5/1995 | Nelson et al. | 327/295 |
| 5,430,397 | 7/1995 | Itoh et al. | 327/295 |
| 5,444,407 | 8/1995 | Ganapathy et al. | 327/415 |
| 5,491,442 | 2/1996 | Mirov et al. | 327/415 |
| 5,523,984 | 6/1996 | Sato et al. | 327/237 |
| 5,550,499 | 8/1996 | Eitrheim | 327/175 |
| 5,570,054 | 10/1996 | Takla | 327/295 |

*Primary Examiner*—Margaret Rose Wambach
*Attorney, Agent, or Firm*—Andrew S. Viger; John L. Maxin

[57] ABSTRACT

Independent functional units are clocked by a clock source generator having at least two adjustable delay lines for independently adjusting the duty cycles of at least two clocks so that speed path margins are individually optimized for each functional unit.

19 Claims, 5 Drawing Sheets

MULTIPLE CLOCK SOURCE GENERATION WITH INDEPENDENTLY ADJUSTABLE DUTY CYCLES

CROSS-REFERENCE TO RELATED APPLICATIONS

This patent is related to commonly assigned U.S. patent Application Ser. No. 08/424,768, now U.S. Pat. No. 5,638,016 entitled "Adjustable Duty Cycle Clock Generator" and Ser. No. 08/423,199, now U.S. Pat. No. 5,550,449 entitled "Single Delay Line Adjustable Duty Cycle Clock Generator", both filed Apr. 18, 1995, the disclosures of both herein incorporated by reference.

BACKGROUND OF THE INVENTION

1. Field of the Invention

The invention relates generally to interfacing multiple functional units together, and more specifically to clock generation of multiple clock signals having a common edge and independently adjustable duty cycles, particularly useful in multi-phase synchronous systems.

2. Description of Related Art

A common technique in the design of complex systems and/or integrated circuits (a.k.a. "chips") is to parse cooperative blocks of circuitry into so-called "functional units". The functional units usually relate either physically or logically with respect to the actual chips on the system circuit board or elements on the chip die. An example of this technique is in the design of a processor (a.k.a. microprocessor). It is to be understood however, that a processor is but one of many applications known to one skilled in the art which can be parsed into multiple functional units and is but one application for the present invention.

By way of example and not limitation, a processor is typically divided into two main functional units namely, a Central Processing Unit (CPU) and a Floating Point Unit (FPU). Up until recently, the CPU and the FPU were separate chips residing in separate packages having an external bus therebetween for communication. More recently however, technological advances have allowed for the CPU and FPU to be integrated onto a single die maintaining however, a bus therebetween for communication. Ideally, communication over the bus would be accomplished synchronously. Unfortunately however, the FPU tends to operate slower than the CPU and consequently, a slower clock is typically used to clock the FPU which may, or may not, be synchronous with the CPU clock. If an asynchronous operation is chosen, the interface between the CPU and the FPU must include so-called "synchronizers" to re-sync incoming data with the respective local clock. One of many drawbacks with asynchronous operation is the associated latency with resynching the data. Another drawback is the increased risk of an occurrence of a metastable condition.

In synchronous FPU operation, an FPU clock is employed which is typically derived from the CPU clock and may be scaled down in frequency by an integer multiple. If the CPU and FPU designs are split into two or more data paths, a performance issue arises. More specifically for example, in a two data path design approach, the input clock is split into two alternating phase clock signals (e.g. Φ1 and Φ2) to clock data paths Φ1 and Φ2 respectively. Delays associated with the first data path (Φ1) and the second data path (φ2) are typically not equal. Accordingly, the triggering edges on clock signals φ1 and φ2 are best adapted to be temporally adjustable to maximize speed path margins so that a higher clock speed is obtainable without compromising reliable operation.

A drawback however, with deriving the scaled FPU clock from the CPU clock is that the temporal adjustments of the φ1 and φ2 clock edges propagate through to the scaled FPU clock and unfortunately, the associated delays for the φ1 and φ2 data paths in the FPU are not necessarily related to the CPU. Hence, the temporal adjustments of the φ1 and φ2 clock edges for the CPU may actual worsen speed path margins in the FPU.

Accordingly, it can be seen from the foregoing, that there is a need for multiple clock source generation with independently adjustable duty cycles so that speed path margins can be optimized in independent functional units.

SUMMARY OF THE INVENTION

To overcome the limitations of the prior art described above, and to overcome other limitations that will become apparent upon reading and understanding the present specification, the present invention discloses the generation of multiple clock signals with independently adjustable duty cycles having a common edge, for clocking separate functional units. An input clock is processed by at least two adjustable delay lines to produce at least two generated clock signals wherein the temporal relationship of an edge on the respective generated clock signals is independently adjustable by the delay lines to individually compensate for speed path margins within the respective functional units.

A first embodiment provides uniform frequency operation wherein a first generated clock signal having independently adjustable leading and trailing edges, and a second generated clock signal having a leading edge slaved to the leading edge of the first generated clock signal and an independently adjustable trailing edge, are reconstituted from an input clock, wherein the first and second generated clock signals may be used to clock first and second functional units.

A second embodiment provides subharmonic operation wherein a first generated clock signal having independently adjustable leading (rising or falling) and trailing (rising or falling) edges, and a second generated clock signal having a leading edge slaved to the leading edge of the first generated clock signal and an independently adjustable trailing edge of less frequency than the trailing edge of the first generated clock signal, are reconstituted from the input clock.

A feature of the present invention is improved system performance, such as in a computer system, with the ability to independently optimize speed path margins in functional units having individual speed path characteristics.

Another feature of the present invention is system impact by interfacing two or more functional units on a common synchronized edge with separate clocks having independently adjustable duty cycles.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a computer system having a processor with multiple functional units clocked with multiple clock sources having independently adjustable duty cycles, in accordance with the principles of the present invention.

DESCRIPTION OF THE PREFERRED EMBODIMENTS

Figure 1:
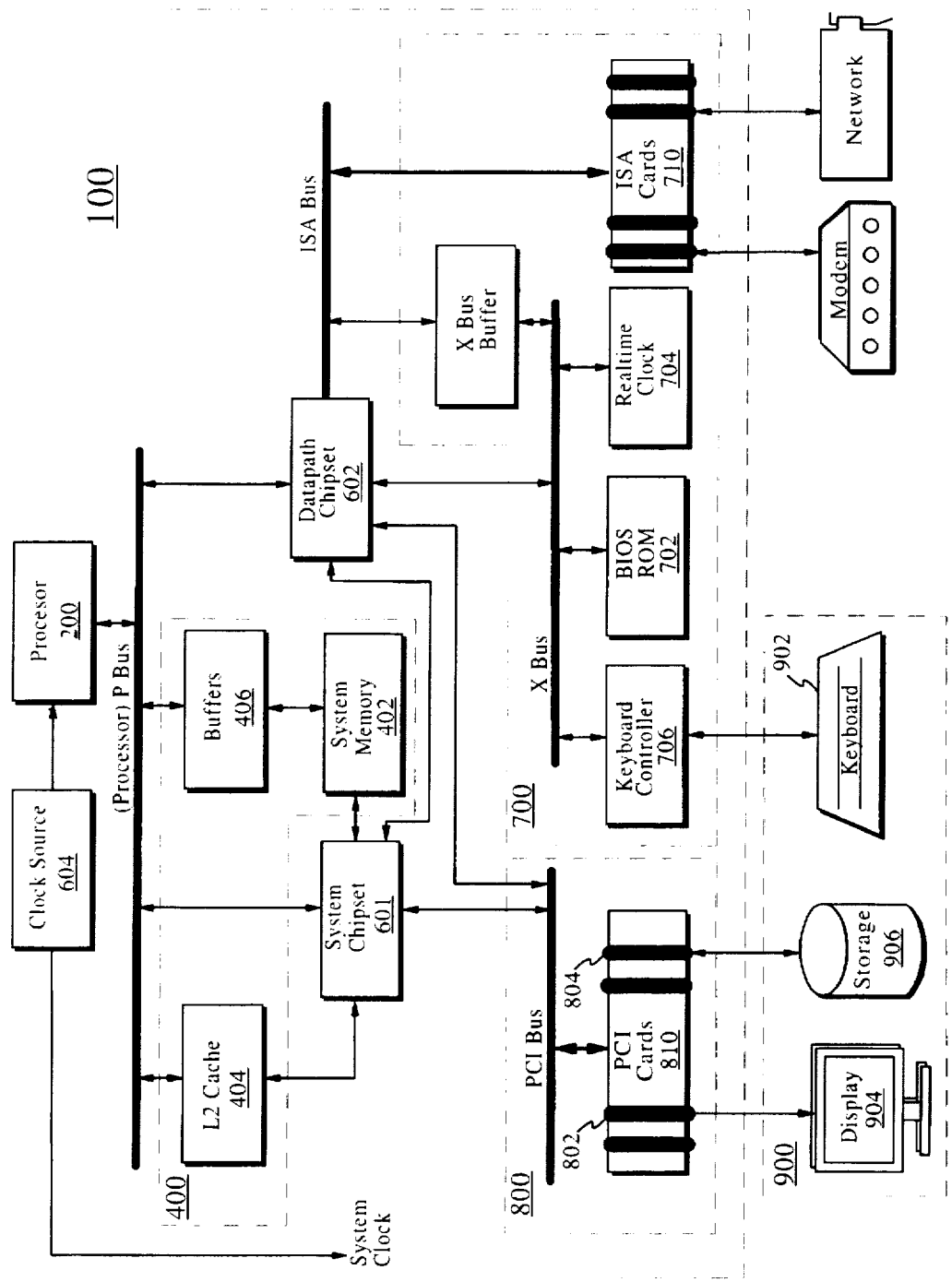
FIG. 1 is an exemplary, but not exclusive, block diagram depicting a computer system having a processor with multiple functional units clocked in accordance with the principles of the present invention.

The detailed description of the preferred embodiments for the present invention is organized as follows:
1. Exemplary System Employing A Processor With Multiple Functional Units
2. Processor Employing Multiple Clocks with Adjustable Duty Cycles
3. First Preferred Embodiment Clock Generator
   3.1 Timing Relationships For Uniform Frequency Clocks
4. Second Preferred Embodiment Clock Generator
   4.1 Timing Relationships For Subharmonic Clocks
5. Latch Based Interface
6. Flip-Flop Based Interface
7. Conclusion This organizational table, and the corresponding headings used in this detailed description, are provided for the convenience of reference only and are not intended to limit the scope of the present invention.

It is to be understood that while the preferred embodiment is described hereinbelow with respect to the x86 computer architecture, it has general applicability to any architecture. Moreover, while the present invention is described with respect to specific functional units within a processor (i.e. CPU and FPU), it has general application to any circuitry employing two or more functional units. Certain terminology related to the x86 computer architecture (such as register names, signal nomenclature, etc.) which are known to practitioners in the field of microprocessor design, are not discussed in detail in order not to obscure the disclosure.

Reference is now made to the accompanying drawings which form a part hereof, and in which is shown by way of illustration specific embodiments in which the invention may be practiced. It is to be understood that other embodiments may be utilized and structural changes may be made without departing from the scope of the present invention.

In order not to obscure the disclosure with structural details which will be readily apparent to those skilled in the art having the benefit of the description herein, the structure, control, and arrangement of conventional circuits have been illustrated in the drawings by readily understandable block representations and timing diagrams, showing and describing details that are pertinent to the present invention. Thus, the block diagram illustrations in the figures do not necessarily represent the physical arrangement of the exemplary system, but are primarily intended to illustrate the major structural components in a convenient functional grouping, wherein the present invention may be more readily understood.

1. Exemplary System Employing A Processor With Multiple Functional Units

FIG. 1 illustrates an exemplary computer system, including a system circuit board (a.k.a. motherboard) 100 and various peripherals and peripheral interfaces. A processor 200 and memory subsystem 400 are disposed on the motherboard 100 and are interconnected over a processor P BUS (sometimes referred to as a CPU or local bus). System logic interfaces the processor 200 to three conventional peripheral buses: X bus, PCI bus, and ISA bus. System logic includes a system chipset 601 and a datapath chipset 602, as well as an external clock source 604 (which provides an input clock to the processor 200 and a system clock to the remaining portions of the motherboard 100). For the exemplary computer system, the P BUS is a conventional address and data bus.

The processor 200 and the memory subsystem 400 reside on the P BUS—the only other direct connections to the P BUS are the system and datapath chipsets 601 and 602, respectively. According to the exemplary division of system logic functions, the system chipset 601 interfaces to a conventional 32-bit PCI peripheral bus, while the datapath chipset 602 interfaces to the 16-bit ISA peripheral bus and the internal 8-bit X bus. Alternative systems allow for a special VL-bus direct interface to the P BUS for video/graphics and other peripherals.

For 32-bit systems with a 32 bit P BUS, some current system logic designs combine the system and datapath chipset functions into a single chipset. For 64-bit systems with a 64-bit P BUS, the pin count required by the 64-bit data bus width currently necessitates that the system and datapath chipset functions be split as indicated in FIG. 1.

Processor 200 is coupled over the P BUS to system memory (DRAM) 402 and L2 (level 2) cache 404—data buffers 406 control P BUS loading by the system DRAM 402. The system chipset 602 includes P BUS, DRAM, and L2 cache control.

The datapath chipset 602 interfaces to the conventional X bus which is an internal 8-bit bus that couples to the BIOS ROM 702, the RTC (real time clock) 704, and a conventional 8-bit keyboard controller 706.

The system and datapath chipsets 601 and 602 provide interface control for the 16-bit ISA bus and the 32-bit PCI bus. The ISA bus maintains compatibility with industry standard peripherals, coupling to ISA peripheral card slots 710. The PCI bus provides a higher performance peripheral interface for selected peripherals, including coupling to PCI peripheral card slots 810—in particular, a video/graphics card 802 provides a video/graphics interface, while a storage controller 804 (which may be included as part of the system chipset) interfaces to storage peripherals.

The motherboard 100, through the PCI, ISA, and X buses, couples external peripherals 900, such as keyboard 902, display 904, and mass storage 906. Network and modem interconnections are provided as ISA cards, but it is to be understood that they could be also provided as PCI cards.

2. Processor Employing Multiple Clocks with Adjustable Duty Cycles

Figure 2:
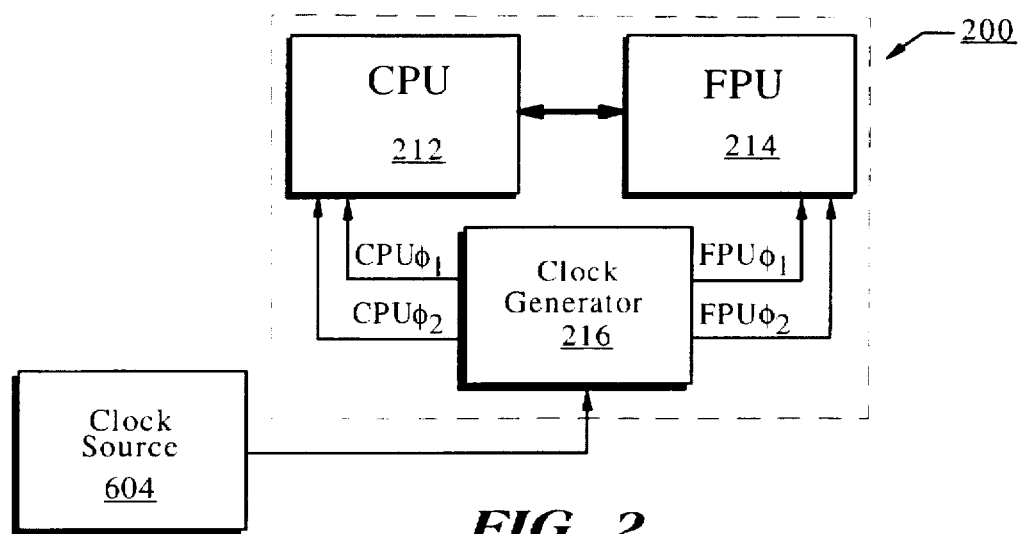
FIG. 2 is an exemplary, but not exclusive, block diagram depicting two functional units coupled together and clocked in accordance with the principles of the present invention.

Referring now to FIG. 2, a block diagram depicts a processor 200 practiced in accordance with the principles of the present invention. It is to be understood that a processor 200 is but one of many applications which would benefit from the present invention. A CPU 212 having a two phase data path is coupled to an FPU 214 having a two phase data path, both of which are clocked by multiple phase clock generator 216. The clock generator 216 receives an input clock from the external clock source 604 and generates CPUφ1, CPUφ2, FPUφ1, and FPUφ2 clock signals, as described in more detail hereinbelow. The external clock source 604 may include phase-locked loop or delay line loop circuitry, the exact details not being necessary for the understanding of the present invention. It is to be understood that CPUφ1 and FPUφ1 are complementary versions of CPUφ2 and FPUφ2, respectively, so for purposes of brevity and clarity, only CPUφ2 and FPUφ2 are discussed.

3. First Preferred Embodiment Clock Generator

Figure 3:
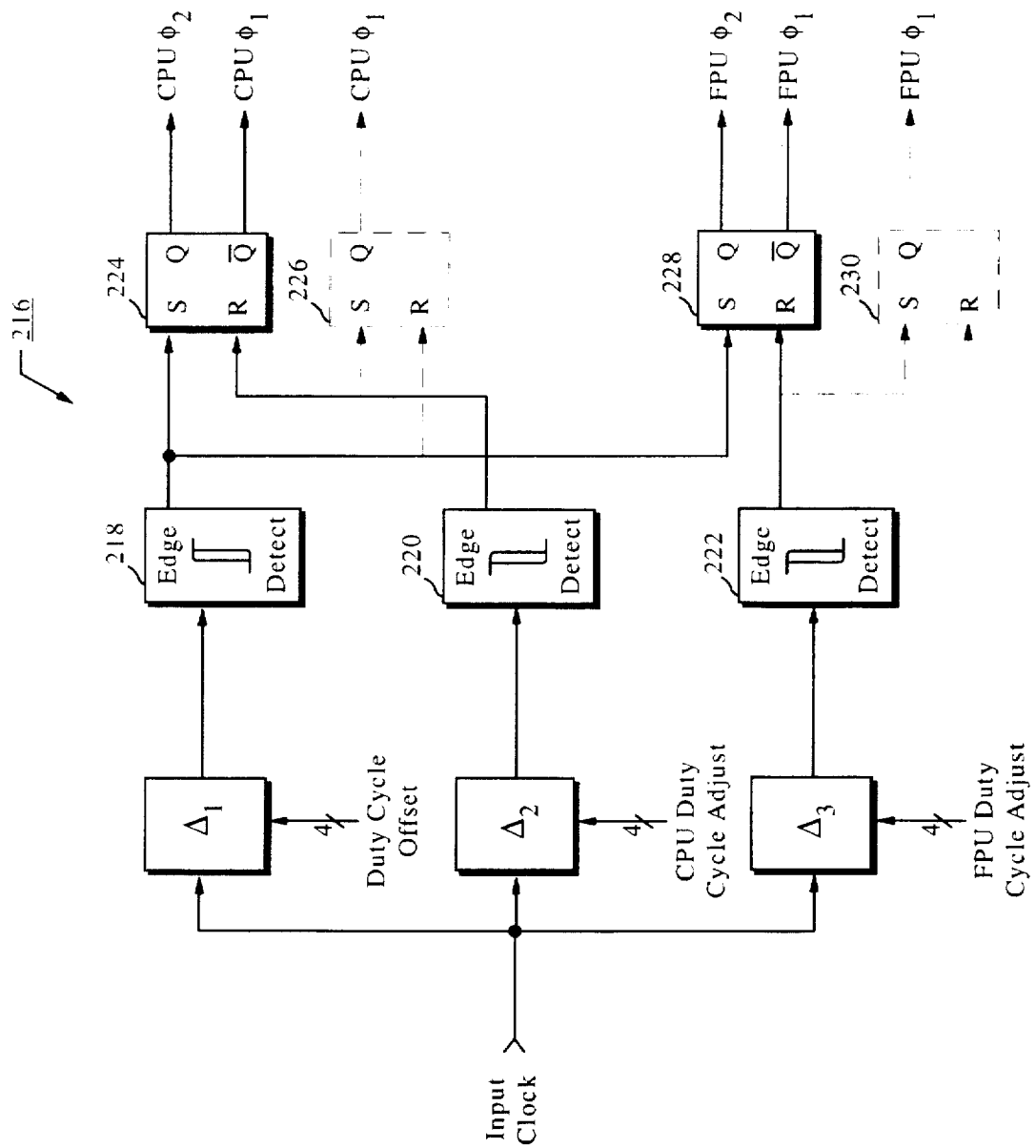
FIG. 3 is a block diagram of a first preferred embodiment for a multiple clock generator circuit with independently adjustable duty cycles, practiced in accordance with the principles of the present invention.

Reference is now made to FIG. 3 which depicts a block diagram of a first preferred embodiment for a multiple clock generator circuit 216 with independently adjustable duty cycles, practiced in accordance with the principles of the present invention. The input clock is coupled to first, second, and third delay lines Δ1, Δ2, and Δ3, respectively. The outputs from Δ1, Δ2 and Δ3 are coupled to first, second, and third edge detectors 218, 220, and 222, respectively. First edge detector 218 preferably detects rising (low-to-high) edges occurring out of Δ1 and generates a short pulse in response thereto. Second and third edge detectors 220 and 222, preferably detect falling (high-to-low) edges occurring out of Δ2 and Δ3, and generate a short pulse in response thereto.

The output of first edge detector 218 is coupled to the set input on first and second S-R latches 224 and 228 and to a reset input on optional third and fourth S-R latches 226 and 230 (depicted as dashed), respectively. The output of second edge detector 220 is coupled to the reset input of first S-R latch 224 and to the set input on optional third S-R latch 226. The output of third edge detector 222 is coupled to the reset input of second S-R latch 228 and to the set input on optional fourth S-R latch 230. The Q output from first S-R latch 224 is the CPUφ2 clock while the Q̄ output is the CPUφ1 clock. Alternatively, the Q output from optional third S-R latch 226 may be used as the CPUφ1 clock. Similarly, the Q output from second S-R latch 228 is the FPUφ2 clock while the Q̄ output is the FPUφ1 clock. Alternatively, the Q output from optional fourth S-R latch 230 may be used as the FPUφ1 clock.

The exact details for delay lines Δ1, Δ2, and Δ3 are not necessary for the understanding of the present invention. Delay line Δ1 may be an adjustable delay or a fixed delay—set between the minimum and maximum delays of adjustable delay lines Δ2 and Δ3. Delay lines Δ2 and Δ3 are preferably independently controlled by CPU Duty Cycle Adjust and FPU Duty Cycle Adjust to set the duty cycle of CPUφ2 and FPUφ2 clock signals, respectively. Exemplary adjustable delay lines for Δ1, Δ2, and Δ3 however are described in commonly assigned U.S. patent applications Ser. No. 08/424,768, entitled "Adjustable Duty Cycle Clock Generator" and Ser. No. 08/423,199, entitled "Single Delay Line Adjustable Duty Cycle Clock Generator", the disclosures of both having been herein incorporated by reference. It should be understood however, that with the aid of the present disclosure, those skilled in the art will readily recognize other configurations for delay lines Δ1, Δ2, and Δ3 without departing from the scope of the present invention.

3.1 Timing Relationships For Uniform Frequency Clocks

Figure 4:
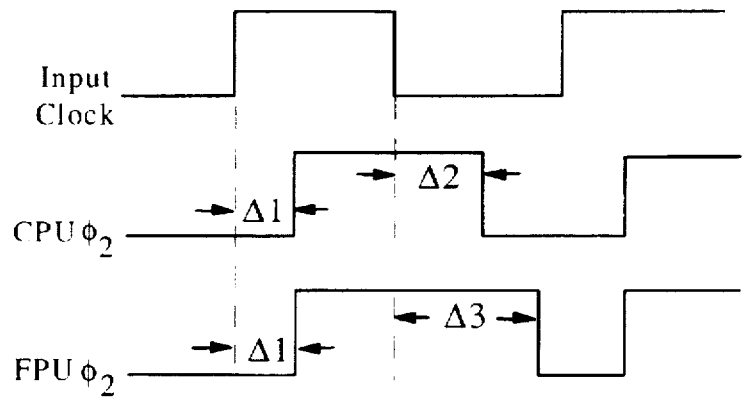
FIG. 4 is a timing diagram of signals generated in the circuit depicted in FIG. 3.

Reference is now made to FIG. 4 which depicts a timing diagram of the temporal relationships of adjustable delays Δ1, Δ2, and Δ3 to the CPUφ2 and FPUφ2 generated clock signals. While the input clock may be of any duty cycle without consequence to the present invention, it is contemplated that a 50% duty cycle input clock will be encountered. Accordingly, the input clock in FIG. 4 is depicted as having a 50% duty cycle with the understanding that any duty cycle input clock would suffice.

The leading (rising) edges of both generated CPUφ2 and PFUφ2 clock signals occur are on the leading (rising) edge of the input clock delayed a time (Δ1) set by delay line Δ1 which may be fixed or adjustable. The trailing (falling) edge of the CPUφ2 clock occurs on the trailing (falling) edge of the input clock signal delayed a time (Δ2) set by adjustable delay line Δ2. The trailing (falling) edge of the FPUφ2 clock occurs on the trailing (falling) edge of the input clock signal delayed a time (Δ3) set by adjustable delay line Δ3.

4. Second Preferred Embodiment Clock Generator

Figure 5:
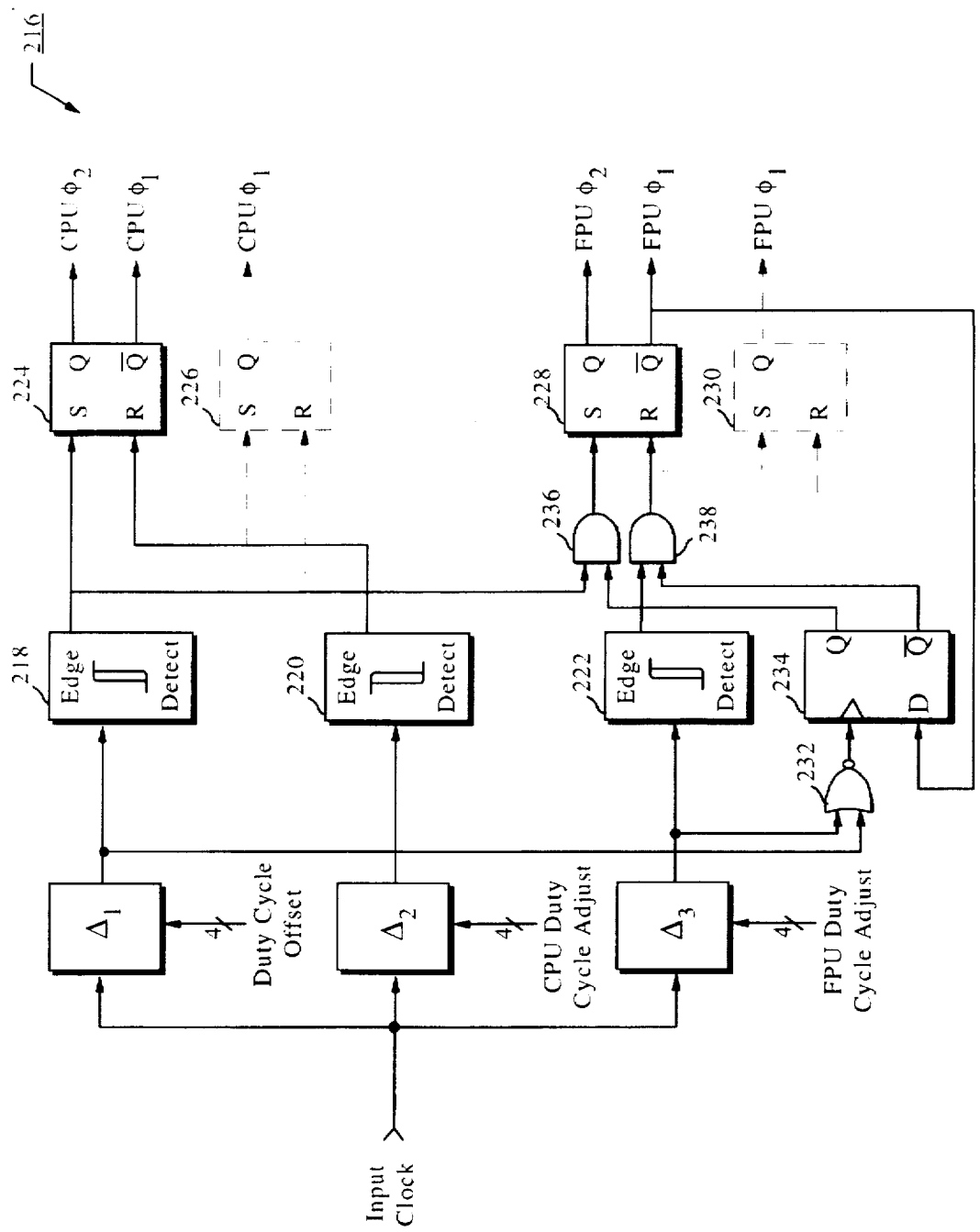
FIG. 5 is a block diagram of a second preferred embodiment for a multiple clock generator circuit with independently adjustable duty cycles, practiced in accordance with the principles of the present invention.

Reference is now made to FIG. 5 which depicts a block diagram of a second preferred embodiment 216' for a multiple clock generator circuit with independently adjustable duty cycles, practiced in accordance with the principles of the present invention. In the second preferred embodiment 216', the PFUφ2 clock signal has a frequency which is half the CPUφ2 clock signal while maintaining an independently adjustable duty cycle. The input clock is coupled to first, second, and third delay lines Δ1, Δ2, and Δ3, respectively. The outputs from Δ1, Δ2 and Δ3 are coupled to first, second, and third edge detectors 18, 20, and 22, respectively. The outputs from Δ1 and Δ3 are further coupled to first and second inputs respectively, on logical NOR gate 232. The output of logical NOR gate 232 is coupled to a clock input on a D-type latch 234.

First and third edge detectors 218 and 222 preferably detect rising (low-to-high) edges occurring out of Δ1 and Δ3 respectively, and generate a short pulse in response thereto. The second edge detector 220 preferably detects falling (high-to-low) edges occurring out of Δ2 and generate a short pulse in response thereto.

The output of first edge detector 218 is coupled to the set input on first S-R latch 224, to the reset input on optional third S-R latch 226 (depicted as dashed), and to a first input on first logical AND gate 236. A second input to first logical AND gate 236 is coupled to the Q output from D-type latch 234. The output of first logical AND gate 236 is coupled to the set input on second S-R latch 228 and to the reset input on optional fourth S-R latch 230. The output of third edge detector 222 is coupled to a first input on second logical AND gate 238. A second input to second logical AND gate 238 is coupled to the Q̄ output from D-type latch 234. The output of second logical AND gate 238 is coupled to the reset input on second S-R latch 228 and to the set input on optional fourth S-R latch 230. The output of second edge detector 220 is coupled to the reset input of first S-R latch 224 and to the set input on optional third S-R latch 226.

The Q output from first S-R latch 224 is the CPUφ2 clock while the Q̄ output is the CPUφ1 clock. Alternatively, the Q output from optional third S-R latch 226 may be used as the CPUφ1 clock. Similarly, the Q output from second S-R latch 228 is the PFUφ2 clock while the Q̄ output is the FPUφ1 clock. Alternatively, the Q output from optional fourth S-R latch 230 may be used as the FPUφ1 clock. The Q̄ output from second S-R latch 228 (Q output from fourth latch 230) is also coupled to the D-input on D-type latch 234.

4.1 Timing Relationships For Subharmonic Clocks

Figure 6:
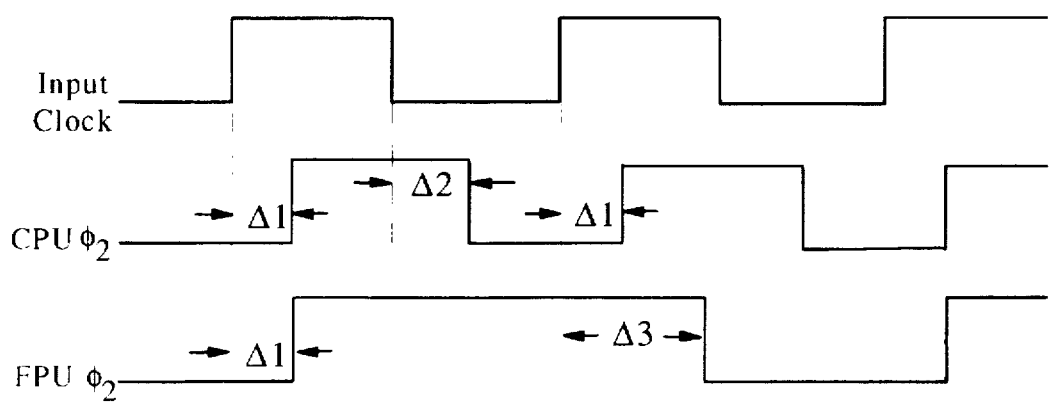
FIG. 6 is a timing diagram of signals generated in circuit depicted in FIG. 5.

Reference is now made to FIG. 6 which depicts a timing diagram of the temporal impact on CPUφ2 and FPUφ2 clock signals from adjustable delays Δ1, Δ2, and Δ3, the D-type latch 234, and logic gates 232, 236, and 238. While the input clock again may be of any duty cycle without consequence to the present invention, it is contemplated that a 50% duty cycle input clock will be encountered. Accordingly, the input clock in FIG. 6 is depicted as having a 50% duty cycle with the understanding that any duty cycle input clock would suffice.

The leading (rising) edges of both generated CPUφ2 and FPUφ2 clock signals again occur are on the leading (rising) edge of the input clock delayed a time (Δ1) set by delay line Δ1. The trailing (falling) edge of the CPUφ2 clock again occurs on the trailing (falling) edge of the input clock signal delayed a time (Δ2) set by adjustable delay line Δ2. The trailing (falling) edge of the PFUφ2 clock however, occurs on the subsequent leading (rising) edge of the input clock signal delayed a time (Δ3) set by adjustable delay line Δ3.

5. Latch Based Interface

Figure 7:
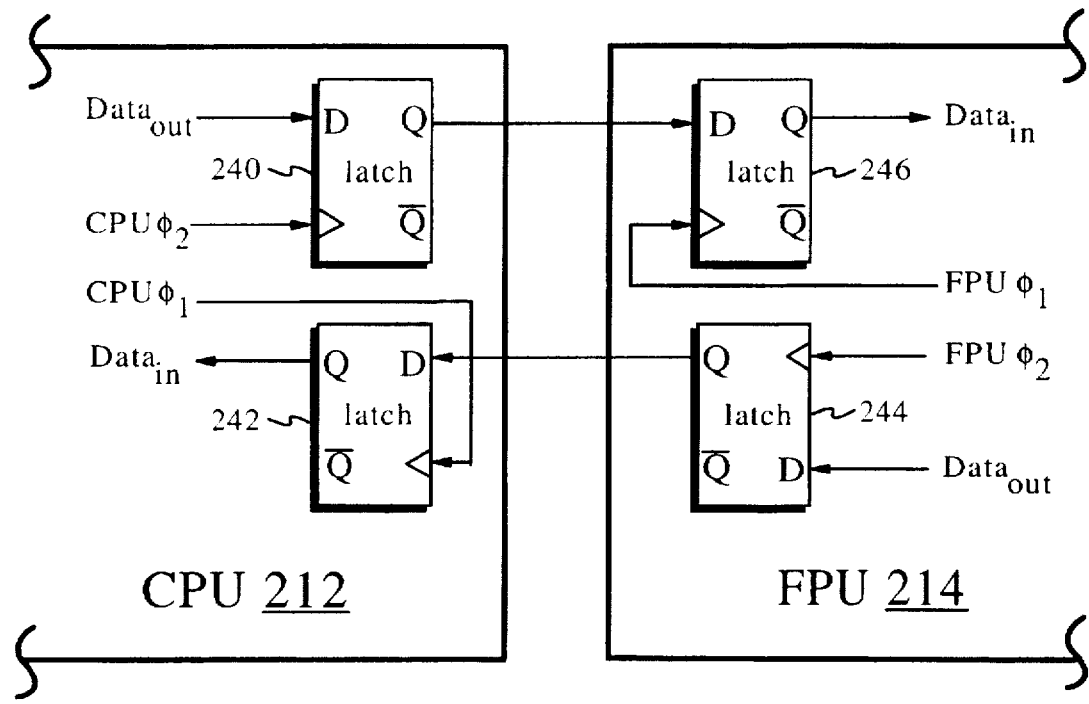
FIG. 7 is a block diagram of a latch-based interface between functional units; and, FIG. 8 is a block diagram of a flip/flop-based interface between functional units.

Reference is now made to FIG. 7 which depicts a block diagram of a latch-based I/O interface between functional units, such as, but not limited to, an FPU 212 and a CPU 214. For clarity, only one input bit and one output bit are depicted with the understanding that one skilled in the art will readily recognize application to a bus having a plurality of Input/Output bits. The output section of the I/O interface portion of the CPU 212 includes at least one D-type latch 240 having its D input coupled to an output data bit (Data$_{out}$) from circuitry within the CPU 212 and its clock input coupled to the CPUφ2 clock from clock generator 216 described hereinabove. The input section of the I/O interface portion of the CPU 212 includes at least one D-type latch 242 having its D input coupled to an output data bit received from the I/O interface portion of the FPU 214 and its clock input coupled to the CPUφ1 clock from clock generator 216 described hereinabove.

The output section of the I/O interface portion of the FPU 214 includes at least one D-type latch 244 having its D input coupled to an output data bit (Data$_{out}$), its clock input coupled to the FPUφ2 clock from clock generator 216 described hereinabove, and its Q output coupled to the D input on D-type latch 242 in the CPU 212. The input section of the I/O interface portion of the FPU 214 includes at least one D-type latch 246 having its D input coupled to the Q output from the D-type latch 240 in the CPU 212 and its clock input coupled to the FPUΦ1 clock from clock generator 216 described hereinabove.

6. Flip-Flop Based Interface

Figure 8:
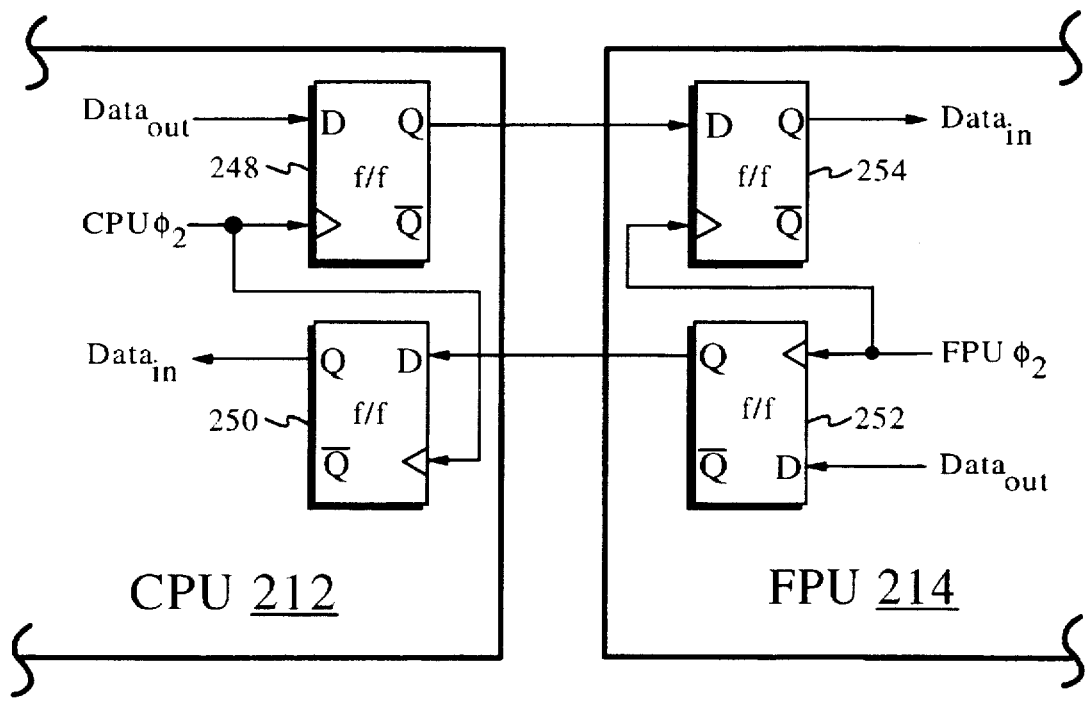

Reference is now made to FIG. 8 which depicts a block diagram of a flip-flop (f/f) based interface between functional units, such as, but not limited to, an FPU 212 and a CPU 214. For clarity, only one input bit and one output bit are depicted with the understanding that one skilled in the art will readily recognize application to a bus having a plurality bits. The output section of the I/O interface portion of the CPU 212 includes at least one D-type f/f 248 having its D input coupled to an output data bit from circuitry within the CPU 212 (Data$_{out}$) and its clock input coupled to the CPUφ2 clock from clock generator 216 described hereinabove. The input section of the I/O interface portion of the CPU 212 includes at least one D-type f/f 250 having its D input coupled to an output data bit received from the I/O interface portion of the FPU 214 and its clock input coupled to the CPUφ2 clock from clock generator 216.

The output section of the I/O interface portion of the FPU 214 includes at least one D-type f/f 252 having its D input coupled to an output data bit from circuitry within the FPU 212 (Data$_{out}$), its clock input coupled to the PFUφ2 clock, and its Q output coupled to the D input on D-type f/f 250 in the CPU 212. The input section of the I/O interface portion of the FPU 214 includes at least one D-type f/f 254 having its D input coupled to the Q output from the D-type f/f 248 in the CPU 212, its clock input coupled to the PFUφ2 clock from clock generator 216.

7. Conclusion

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A multiple phase clock generator comprising:
   (a) delay line means, coupled to receive an input clock having leading and trailing edges, for generating at least two clock signals delayed a predetermined time from the input clock;
   (b) edge detector means, coupled to the delay line means, for generating a pulse responsive to a predetermined edge on the at least two clock signals; and,
   (c) S-R means, coupled to the edge detector means, for generating at least two clock signals having a temporally common first edge and an independently adjustable second edge.

2. A multiple phase clock generator as recited in claim 1 wherein one of the at least two clock signals have a frequency $f$ and at least one of the at least two clock signals has a frequency which is an integer multiple of $f$.

3. A multiple phase clock generator comprising:
   (a) first, second, and third delay lines, each having an input coupled to receive an input clock and an output;
   (b) first and second latches, each having a set input, a reset input, an output, and a complementary output;
   (c) a first edge detector coupled between the output of the first delay line and the set inputs on the first and second latches;
   (d) a second edge detector coupled between the output of the second delay line and the reset input on the first latch; and,
   (e) a third edge detector coupled between the output of the third delay line and the reset input on the second latch.

4. A multiple phase clock generator as recited in claim 3 further comprising third and fourth latches having set and reset inputs cross coupled with respect to the set and reset inputs of the first and second latches in (b), respectively.

5. A multiple phase clock generator as recited in claim 3 wherein the first delay line has a fixed delay of Δ1.

6. A multiple phase clock generator as recited in claim 3 wherein the second delay line has a programmable delay of Δ2.

7. A multiple phase clock generator as recited in claim 3 wherein the third delay line has a programmable delay of Δ3.

8. A multiple phase clock generator as recited in claim 3 wherein the first edge detector (c) detects rising edges.

9. A multiple phase clock generator as recited in claim 3 wherein the second edge detector (d) detects falling edges.

10. A multiple phase clock generator as recited in claim 3 wherein the third edge detector (e) detects falling edges.

11. A multiple phase clock generator as recited in claim 3 further comprising:
   (f) a NOR gate having a first input coupled to the first delay line output, a second input coupled to the second delay line output, and an output;
   (g) a third latch having a clock input coupled to the NOR gate output, a D input coupled to the complementary output of the second latch, and an output, and a complementary output;

(h) a first AND gate having a first input coupled to the first edge detector, a second input coupled to the output of the third latch, and an output coupled to the set input on the second latch; and, (i) a second AND gate having a first input coupled to the third edge detector, a second input coupled to the complementary output of the third latch, and an output coupled to the reset input on the second latch.

12. An adjustable duty cycle clock generator as recited in claim 11 further comprising fourth and fifth latches having set and reset inputs cross coupled with respect to the set and reset inputs of the first and second latches in (b), respectively.

13. A computer system comprising:
   (a) at least two functional units; and,
   (b) clock generation means for generating at least two clock signals each having a common synchronous edge and an independently adjustable edge to clock the at least two functional units wherein data signals between the at least two functional units are transmitted on the common synchronous edges of the at least two clock signals.

14. A method of interfacing at least two functional units comprising steps of:
   (a) generating at least two clock signals having a common synchronous edge;
   (b) independently adjusting an edge on the at least two clock signals other than the common synchronous edge; and,
   (c) transferring data signals between the at least two functional units on the common synchronous edges of the at least two clock signals.

15. A computer system comprising:
   (a) a motherboard;
   (b) a processor disposed on the motherboard;
   (c) memory disposed on the motherboard and coupled to the processor; and,
   (d) a multiple phase clock generator including,
      (i) delay line means, coupled to receive an input clock, for generating at least two clock signals delayed a predetermined time from the input clock;
      (ii) edge detector means, coupled to the delay line means for generating a pulse responsive to a predetermined edge on the at least two clock signals; and,
      (iii) S-R means, coupled to the edge detector means, for generating at least two clock signals having a common edge and an independently adjustable second edge.

16. A method of generating multiple adjustable duty cycle clock signals having a common edge for clocking multiple functional units comprising steps of:
   (a) receiving an input clock having leading and trailing edges;
   (b) responsive to the leading edges of the input clock, generating at least two clock signals having a common edge; and,
   (c) responsive to the trailing edges of the input clock, generating an independently adjustable second edge on each of the at least two clock signals.

17. A method as recited in claim 16 wherein one of the at least two clock signals have a frequency ($f$) and at least one of the at least two clock signals has a frequency which is an integer multiple of $f$.

18. A method of generating multiple adjustable duty cycle clock signals having a common edge for clocking multiple functional units comprising steps of:
   (a) receiving an input clock having leading and trailing edges;
   (b) responsive to the trailing edges of the input clock, generating at least two clock signals having a common edge; and,
   (c) responsive to the leading edges of the input clock, generating an independently adjustable second edge on each of the at least two clock signals.

19. A method as recited in claim 18 wherein one of the at least two clock signals have a frequency ($f$) and at least one of the at least two clock signals has a frequency which is an integer multiple of $f$.

* * * * *